United States Patent [19]
Li et al.

[11] Patent Number: 6,123,264
[45] Date of Patent: Sep. 26, 2000

[54] APPARATUS AND METHOD FOR DETERMINING A DISTANCE TO A TARGET

[75] Inventors: Yajun Li, Oakdale; Joseph Katz, Stony Brook; Jerome Swartz, Old Field; Daniel McGlynn, Brooklyn; Edward Barkan, Miller Place, all of N.Y.

[73] Assignee: Symbol Technologies, Inc., Holtsville, N.Y.

[21] Appl. No.: 08/833,650

[22] Filed: Apr. 8, 1997

Related U.S. Application Data

[62] Division of application No. 08/269,170, Jun. 30, 1994, Pat. No. 5,672,858.

[51] Int. Cl.⁷ ............................................. G06K 7/10
[52] U.S. Cl. ........................... 235/472.01; 235/462.01
[58] Field of Search ................................ 235/462, 472, 235/454, 469, 470, 465, 460

[56] References Cited

U.S. PATENT DOCUMENTS

| | | | |
|---|---|---|---|
| 2,216,716 | 10/1940 | Withen . | |
| 3,393,600 | 7/1968 | Bess . | |
| 3,812,325 | 5/1974 | Schmidt | 235/462 |
| 3,992,574 | 11/1976 | Bouwhuis et al. . | |
| 4,096,992 | 6/1978 | Nojiri et al. | 235/472 |
| 4,136,821 | 1/1979 | Sugiura et al. | 235/462 |
| 4,147,295 | 4/1979 | Nojiri et al. | 235/470 |
| 4,346,292 | 8/1982 | Routt, Jr. et al. | 235/462 |
| 4,542,528 | 9/1985 | Sanner et al. | 235/472 |
| 4,877,949 | 10/1989 | Danielson et al. | 235/462 |
| 4,939,356 | 7/1990 | Rando et al. | 235/467 |
| 5,010,241 | 4/1991 | Butterworth . | |
| 5,216,230 | 6/1993 | Nakazawa | 235/462 |
| 5,235,167 | 8/1993 | Dvorkis et al. . | |
| 5,410,141 | 4/1995 | Koenck et al. | 235/472 |
| 5,534,684 | 7/1996 | Danielson | 235/472 |
| 5,600,121 | 2/1997 | Kahn et al. | 235/472 |
| 5,616,909 | 4/1997 | Arackellian . | |
| 5,617,174 | 4/1997 | Mikami . | |
| 5,736,725 | 4/1998 | Danielson | 235/462 |
| 5,770,847 | 6/1998 | Olmstead | 235/462 |
| 5,814,803 | 9/1998 | Olmstead et al. | 235/462 |

FOREIGN PATENT DOCUMENTS

| | | | |
|---|---|---|---|
| 0026623 | 3/1978 | Japan | 235/462 |
| 0028336 | 3/1978 | Japan | 235/462 |
| 0129976 | 10/1981 | Japan | 235/462 |
| 0046474 | 3/1983 | Japan | 235/462 |
| 0172081 | 9/1984 | Japan | 235/462 |
| 016477 | 7/1987 | Japan | 235/462 |
| 0172385 | 7/1988 | Japan | 235/462 |

*Primary Examiner*—Thien M. Le
*Attorney, Agent, or Firm*—Finnegan, Henderson, Farabow, Garrett & Dunner, L.L.P.

[57] ABSTRACT

A range finder for use with a bar code scanner. An image of a scan line is detected by a sensor array. Distance from the scanner to the bar code symbol is determined from the length of the detected scan line image.

16 Claims, 2 Drawing Sheets

APPARATUS AND METHOD FOR DETERMINING A DISTANCE TO A TARGET

This is a division of application Ser. No. 08/269,170, filed Jun. 30, 1994, now U.S. Pat. No. 5,672,858.

BACKGROUND OF THE INVENTION

1. Field of the Invention

This invention generally relates to an apparatus and method operative for electro-optically reading indicia having parts of different light reflectivity, for example, bar code or matrix array symbols, and, more particularly, to apparatus using both charge coupled device (CCD) technology and laser beam scanning technology for properly positioning, orienting and/or aiming such apparatus and reading one or two-dimensional bar code symbols, and to a method therefor.

2. Description of the Related Art

Various optical readers and optical scanning systems have been developed heretofore for reading indicia such as bar code symbols appearing on a label or on the surface of an article. The bar code symbol itself is a coded pattern of indicia comprised of a series of bars of various widths spaced apart from one another to bound spaces of various widths, the bars and spaces having different light-reflecting characteristics. The readers and scanning systems electro-optically transform the graphic indicia into electrical signals, which are decoded into alphanumerical characters that are intended to be descriptive of the article or some characteristic thereof. Such characters are typically represented in digital form and utilized as an input to a data processing system for applications in point-of-sale processing, inventory control, and the like. Scanning systems of this general type have been disclosed, for example, in U.S. Pat. Nos. 4,251,798; 4,369,361; 4,387,297; 4,409,470; 4,760,248; 4,896,026, all of which have been assigned to the same assignee as the instant application.

As disclosed in some of the above patents, one embodiment of such a scanning system resides, inter alia, in a hand-held, portable laser scanning head supported by a user, which is configured to allow the user to aim the head, and more particularly, a light beam, at a target and a symbol to be read.

The light source in a laser scanner bar code reader is typically a gas laser or semiconductor laser. The use of semiconductor devices as the light source in scanning systems is especially desirable because of their small size, low cost and low voltage requirements. The laser beam is optically modified, typically by a focusing optical assembly, to form a beam spot of a certain size at the target distance. It is preferred that the cross section of the beam spot at the target distance be approximately the same as the minimum width between regions of different light reflectivity, i.e., the bars and spaces of the symbol.

The bar code symbols are formed from bars or elements typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the bar code symbol is referred to as the density of the symbol. To encode a desired sequence of characters, a collection of element arrangements are concatenated together to form the complete bar code symbol, with each character of the message being represented by its own corresponding group of elements. In some symbologies, a unique "start" and "stop" character is used to indicate where the bar code begins and ends. A number of different bar code symbologies exist. These symbologies include UPC/EAN, Code 39, Code 128, Codabar, and Interleaved 2 of 5, etc.

For the purpose of our discussion, characters recognized and defined by a symbology shall be referred to as legitimate characters, while characters not recognized and defined by that symbology are referred to as illegitimate characters. Thus, an arrangement of elements not decodable by a given symbology corresponds to an illegitimate character(s) for that symbology.

In the laser beam scanning systems known in the art, the laser light beam is directed by a lens or similar optical components along a light path toward a target that includes a bar code or other symbol on the surface. The moving-beam scanner operates by repetitively scanning the light beam in a line or series of lines across the symbol by means of motion of a scanning component, such as the light source itself or a mirror, disposed in the path of the light beam. The scanning component may either sweep the beam spot across the symbol and trace a scan line or pattern across the symbol, or scan the field of view of the scanner, or do both.

Bar code reading systems also include a sensor or photodetector which functions to detect light reflected or scattered from the symbol. The photodetector or sensor is positioned in the scanner in an optical path so that it has a field of view which ensures the capture of a portion of the light which is reflected or scattered off the symbol and is detected and converted into an electrical signal. Electronic circuitry or software decode the electrical signal into a digital representation of the data represented by the symbol that has been scanned. For example, the analog electrical signal detected by the photodetector may be converted into a pulse width modulated digital signal, with the widths corresponding to the physical widths of the bars and spaces. Such a digitized signal is then decoded based upon the specific symbology used by the symbol into a binary representation of the data encoded in the symbol, and subsequently to the alphanumeric characters so represented.

Moving-beam laser scanners are not the only type of optical instrument capable of reading bar code symbols. Another type of bar code reader particularly relevant to the present invention is one which incorporates detectors based upon charge coupled device (CCD) technology. In such prior art readers the size of the detector is typically smaller than the symbol to be read because of the image reduction by the objective lens in front of the CCD. The entire symbol is flooded with light from a light source such as light emitting diodes (LED) in the reader, and each CCD cell is sequentially read out to determine the presence of a bar or a space.

The working range of CCD bar code scanners can be rather limited as compared to laser based scanners and is especially low for CCD based scanners with an LED illumination source. Other features of CCD based bar code scanners are set forth in parent applications Ser. No. 07/317,553 filed Mar. 1, 1989, now abandoned and Ser. No. 07/717,771 filed Jun. 14, 1991, now U.S. Pat. No. 5,210,398; which are hereby incorporated by reference, and which are illustrative of the earlier technological techniques proposed for use in CCD scanners to acquire and read two-dimensional indicia.

It is a general object of the present invention to provide an improved indicia scanner without the limitations of prior art readers.

It is a further object of the present invention to provide an indicia scanner capable of providing the features of both a flying spot light beam scanner and an imaging scanner in a single unit.

It is yet another object of the invention to provide a hand-held indicia reader that is capable of aiming or being oriented and also imaging the field of view.

It is an even further object of the invention to provide a method which can be used to accomplish one or more of the above objectives.

Additional objects, advantages and novel features of the present invention will become apparent to those skilled in the art from this disclosure, including the following detail description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

SUMMARY OF THE INVENTION

According to the present invention a scanning device for scanning or reading indicia of differing light reflectivity, such as bar code or matrix array symbols containing optically encoded information, is provided. The scanning device has a single light emitter, preferably including a laser or light emitting diode, for generating a scanning light beam to visually illuminate sequential portions of the indicia and produce reflected light from the indicia. A sensor, such as a linear array of a charge coupled device or two-dimensional array of a solid state imaging device simultaneously detects light from the light beam or ambient light reflected from portions of the indicia and generates an electrical signal representative of the reflected light from the portions of the indicia. The sensor may operate in either a scanning or non-scanning mode, the latter being similar to that of a single photodetector, or in both modes. When operating in a scanning mode, the sensor may scan a field of view at a rate faster or substantially slower than the scanning light beam. The sensor may be controlled to scan a field of view only periodically and may function as a range detector to detect the distance between the scanning device and targeted indicia. The sensors' operation as a range detector is further described below. The emitter and sensor may be disposed in a hand-held housing to allow for portable operation.

Additionally, in accordance with other aspects of this embodiment, a photodetector, such as a photodiode, for detecting the reflection of light from the visible light beam off the indicia may be provided. With the photodetector incorporated in the scanning device, the sensor is beneficially used to detect either ambient light or light from the light beam reflected off one portion of the indicia, or is utilized to estimate the distance or range between the radii and the target, while the photodetector is used to detect light from the scanning light beam reflected off another portion of the indicia.

In accordance with still other aspects of the invention as embodied in this embodiment, the same sensor or, a second sensor is provided for ranging. The sensor senses the change in the image produced by the scanned visible light beam as the separation distance between the indicia and the scanning device is increased or decreased. The sensor also generates an electrical signal indicative of the separation distance. Preferably the sensor is a position sensitive sensor or an array of detection elements.

In accordance with the scanning method of the present invention, a scanning light beam, preferably a visible laser light beam, is generated by a single light source to visually illuminate sequential portions of the indicia in order to produce reflected light from the indicia. The light reflected from portions of the indicia, which may be ambient light or light from the light beam, is simultaneously sensed preferably using an imaging technique. The sensing may include detecting visible light reflected from a portion of the indicia which is in the form of a bull's eye mark. The sensing may be performed only periodically. Additionally, ranging may also be performed to determine the distance to indicia. An electrical signal representative of the detected light reflected from the portions of the indicia is generated.

According to still further aspects of this method, range finding is performed. Range finding is accomplished by sensing the change in an image produced by the visible light beam while increasing or decreasing of the separation distance between the indicia and the scanning device. An electrical signal can then be generated which is indicative of the separation distance.

DETAILED DESCRIPTION OF THE PREFERRED EMBODIMENTS

Figure 1:
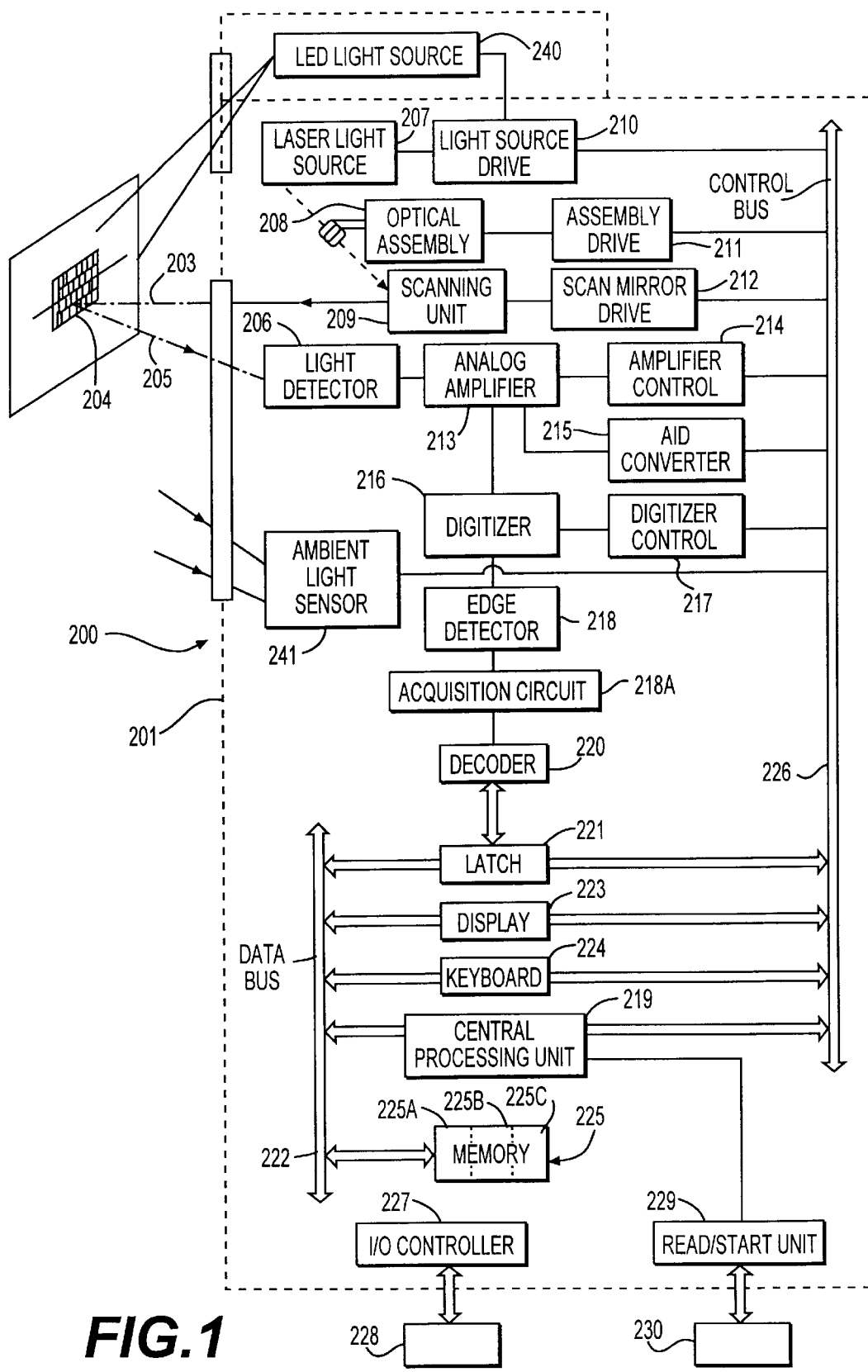
FIG. 1 is a block diagram of the scanning system according to the present invention.
Figure 2A:
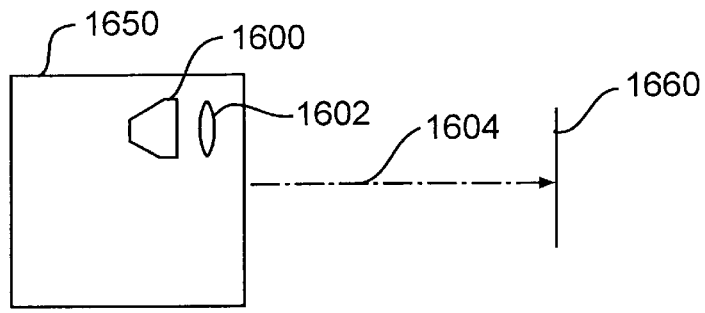
FIGS. 2A–2D are schematic representations of the range finder in accordance with the present invention.
Figure 2B:
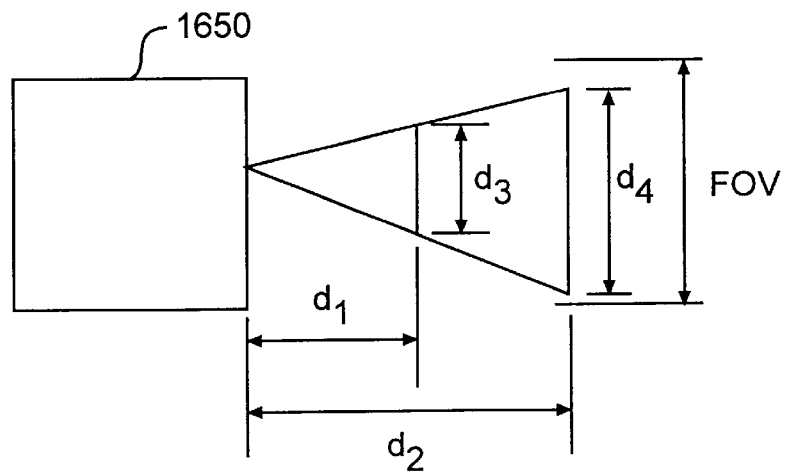
Figure 2C:
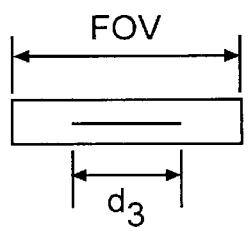
Figure 2D:
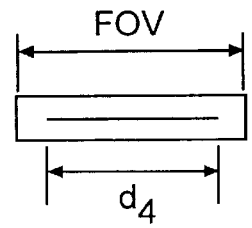

Referring to FIG. 1, there is shown a highly simplified block diagram representation of an embodiment of one type of indicia reader that may be designed according to the principles of the present invention. The reader 200 may be implemented in a portable scanner, or as a desk-top workstation or stationary scanner. In the preferred embodiment, the reader is implemented in a light-weight plastic housing 201.

In one preferred embodiment, the reader 200 may be a gun-shaped device, having a pistol-grip type of handle; another embodiment is a hand-mounted unit. A movable trigger switch on the housing may be employed to allow the user to manually activate the scanner when the user has positioned the device to point at the symbol to be read. Various "triggerless" activation techniques can also be used as will be subsequently described.

The first preferred embodiment may generally be of the style disclosed in U.S. Pat. No. 4,760,248, issued to Swartz et al., or in U.S. Pat. No. 4,896,026 assigned to Symbol Technologies, Inc., and also similar to the configuration of a bar code reader commercially available as part number LS 8100 or LS 2000 from Symbol Technologies, Inc. Alternatively, or in addition, features of U.S. Pat. No. 4,387,297 issued to Swartz et al., or U.S. Pat. No. 4,409,470 issued to Shepard et al., both such patents being assigned to Symbol Technologies, Inc., may be employed in constructing the bar code reader unit of FIG. 1. These U.S. Pat. Nos., 4,760,248, 4,896,026 and 4,409,470, are incorporated herein by reference, but the general design of such devices will be briefly described here for reference.

Turning to FIG. 1 in more detail, an outgoing light beam 203 is generated in the reader 200 by a light source 207, usually a laser diode or the like. The light beam from light source 207 is optically modified by an optical assembly 208 to form a beam having certain characteristics. The beam sized and shaped by the assembly 208 is applied to a scanning unit 209. The light beam is deflected by the scanning unit 209 in a specific scanning pattern, i.e. to form a single line, a linear raster scan pattern, or more complex pattern. The scanned beam 203 is then directed by the scanning unit 209 through an exit window 202 to impinge upon a bar code or other symbol 204 disposed on a target a few inches from the front of the reader. In the embodiments in which the reader 200 is portable, the user aims or positions the portable unit so this scan pattern transverses the symbol 204 to be read. Reflected and/or scattered light 205 from the symbol is detected by a light detector 206, which may be a CCD array, in the reader, producing electrical signals to be processed and decoded for reproducing the data represented by the symbol. As used hereinafter, the term "reflected light" shall mean reflected and/or scattered light.

The characteristics of each of the optical components 207, 208 and 209 may be independently controlled by drive units 210, 211 and 212 respectively. The drive units are operated by digital control signals sent over the control bus 226 by the central processing unit 219, which is preferably implemented by means of a microprocessor contained in the housing 201.

A second, optional light source 240, such as an LED array, may also be provided and independently controlled by drive unit 210.

The output of the light detector 206 is applied to an analog amplifier 213 having an adjustable or selectable gain and bandwidth. An amplifier control unit 214 is connected to the analog amplifier 213 to effect the appropriate adjustment of circuit values in the analog amplifier 213 in response to control signals applied to the control unit 214 over the control bus 226. An ambient light sensor 241 is also provided which provides an output to the control bus 226.

One output of the analog amplifier 213 is applied to an analog-to-digital (A/D) converter 215 which samples the analog signal to be tested by the CPU 219. The A/D converter is connected to the control bus 226 to transfer the sampled digital signal for processing by the CPU 219.

Another output of the analog amplifier 213 is applied to a digitizer 216. The digitizer 216 converts the analog signal from the analog amplifier 213 into a pulse width modulated digital signal. One type of digitizer is described in U.S. Pat. No. 4,360,798. Circuits such as those contained in digitizer 216 have variable threshold levels which can be appropriately adjusted. The digitizer control unit 217 is connected to the digitizer 216 and functions to effect the appropriate adjustment of threshold levels in the digitizer 216 in response to control signals applied to the control unit 217 by the CPU 219 over the control bus 226.

The output of the digitizer 216 is applied to an edge detector 218. The operation of the edge detector 218 can be explained with reference to the discussion in co-pending Ser. No. 07/897,835 with respect to corresponding component 118 in that application.

The edge detector 218 is connected to the decoder 220, which functions in the manner described in the background of the invention.

The decoded data is stored in a latch 221 which is connected to a data bus 222. The latch 221 is also connected to a control bus 226 which is also connected to the CPU 219.

FIGS. 2A–2D depict various aspects of the range finder which may be included in the above described embodiment of the invention. Range finders are typically included in devices such as auto focus type cameras. As shown, the sensor array 1600, such as a CCD array, and lens 1602 sense the movement and position of the image produced by the scanning light beam 1604 as the distance between the symbol 1660 and the scanner 1650 increases or decreases. No secondary light source is required for range finding. A positive sensitive sensor could be used in lieu of sensor array 1600 if desired. The results of the range finding can be used in an algorithm directed to modify the scan parameters if the distance between the scanner 1650 and the symbol 1660 reach a predetermined threshold. For example, if a threshold is exceeded, it may be beneficial to activate an LED, even if the ambient light level appears to be sufficient to obtain a satisfactory scan. It may also be advantageous to adjust the characteristics of the optical components, as discussed with reference to FIG. 1, as the distance reaches one or more predetermined thresholds.

The operation of the range finder will now be described with reference to FIGS. 2A–2D. As shown the scanner 1650 has a field of view (FOV). The scan line image detected by the sensor array 1600 has a length $d_3$ when the targeted symbol 1660 is a distance $d_1$ from the scanner 1650. On the other hand, when the symbol 1660 is a distance $d_2$, which is greater than the distance $d_1$, from the scanner 1650, the scan line image detected by the CCD 1600 has a length of $d_4$ which is greater than $d_3$. Thus, the length of the scan line image detected by the sensor array 1600 can be used to determine the distance of the scanner 1650 from the target symbol 1660. Once the length of the image is determined, it can, for example be compared in a comparator circuit, by software implementing an appropriate algorithm, or using other conventional means, to correlate the length of the detected image with a distance or range of the symbol.

Although certain embodiments of the invention have been discussed without reference to the scanner housing, triggering mechanism and/or other features of conventional scanners, it will be understood that a variety of housing styles and shapes and triggering mechanisms could be used. Other conventional features can also be included if so desired. The invention is directed primarily to a portable hand-held scanning device and tunnel type scanner system, and thus is preferably implemented using miniaturized components such as those described herein or in the materials referenced herein, or otherwise known in the art. However, the scanner of the present invention is not limited to use in portable devices or tunnel type scanner systems and can also be easily adapted for use in any housing which might be desirable or required for a particular application.

Additionally, even though the present invention has been described with respect to reading one or two-dimensional bar code and matrix array symbols, it is not limited to such embodiments, but may also be applicable to other indicia scanning or data acquisition applications. It is conceivable that the method of the present invention may also find application for use with various machine vision or optical character recognition applications in which information is derived from indicia such as printed characters or symbols, or from the surface or configurational characteristics of the article being scanned.

In all of the various embodiments, the elements of the scanner may be implemented in a very compact assembly or package such as a single printed circuit board or integral module. Such a board or module can interchangeably be used as the dedicated scanning element for a variety of different operating modalities and types of data acquisition systems. For example, the module may be alternately used in a hand-held manner, a table top goose neck scanner attached to a flexible arm or mounting extending over the surface of the table or attached to the underside of the table top, or mounted as a subcomponent or subassembly of a more sophisticated data acquisition system such as a tunnel scanner system.

Each of these different implementations is associated with a different modality of reading bar code or other symbols. Thus, for example, the hand-held scanner is typically operated by the user "aiming" the scanner at the target; the table top scanner operated by the target moved rapidly through the scan field, or "presented" to a scan pattern which is imaged on a background surface. Still other modalities within the scope of the present invention envision the articles being moved past a plurality of scan modules oriented in different directions so at least the field of view allows one scan of a symbol which may be arbitrarily positioned on the article.

The module would advantageously comprise an optics subassembly mounted on a support, and an image sensor component. Control or data lines associated with such components may be connected to an electrical connector mounted on the edge or external surface of the module to enable the module to be electrically connected to a mating connector associated with other elements of the data acquisition system.

An individual module may have specific scanning or decoding characteristics associated with it, e.g. operability at a certain working distance, or operability with one or more specific symbologies or printing densities. The characteristics may also be defined through the manual setting of control switches associated with the module or automatically. The user may also adapt the data acquisition system to scan different types of articles or the system may be adapted for different applications by interchanging modules in the data acquisition system through the use of a simple electrical connector.

The scanning module described above may also be implemented within a self-contained data acquisition system including one or more such components as keyboard, display, printer, data storage, application software, and data bases. Such a system may also include a communications interface to permit the data acquisition system to communicate with other components of a local or wide area network or with the telephone exchange network, either through a modem or an ISDN interface, or by low power radio broadcast from a portable terminal to a stationary or mobile receiver.

It will be understood that each of the features described above, or two or more together, may find a useful application in other types of scanners and readers differing from the types described above.

As described above, an improved indicia reader without the limitations of prior art readers is provided. The indicia reader is capable of providing an elongated scan line across indicia located close to the scanner head. The reader can read one or two-dimensional or even more complex indicia. The reader is also capable of being aimed or oriented while imaging the indicia. Laser scanning with CCD imaging is provided. The reader is capable of reading indicia of different symbology types including indicia comprised of a matrix array of geometric set shapes such as UPSCODE(TM).

The novel features characteristics of the invention are set forth in the appended claims. The invention itself, however, as well as other features and advantages thereof, will be best understood by reference to a detailed description of a specific embodiment, when read in conjunction with the accompanying drawings.

What is claimed is:

1. A reader for reading indicia having areas of differing light reflectivity on a target, comprising:

a light source for producing an outgoing light beam;

a detector for detecting light reflected from the target; and a target distance sensor for establishing the target distance by ascertaining the position of an image of the light reflected from the target on the detector.

2. In a hand held apparatus, a range finder for determining a distance to a target to be imaged, comprising:

a light source for producing light which scans the target;

target distance sensor for imaging light reflected from the target and for computing a distance to the target by ascertaining a length of the reflected light image.

3. The range finder as in claim 2, further comprising a lens located between the detector and the target.

4. The range finder as in claim 2, where the distance sensor includes a CCD sensor.

5. The range finder as in claim 2, where the light source includes a laser.

6. The range finder as in claim 2, where the apparatus is a bar code reader.

7. In a hand held apparatus, a range finder for determining a distance to a target, comprising:

a light source for producing light;

a scanner for scanning the light across the target;

a distance sensor for determining the distance to the target based on an image of the scanned light reflected from the target.

8. The range finder as in claim 7, where the distance sensor includes a CCD sensor which detects the image of the scanned light reflected from the target.

9. The range finder as in claim 7, where the distance sensor determines the distance based on a length of the image of the scanned light beam reflected from the target.

10. The range finder as in claim 7, where the light source is a laser.

11. The range finder as in claim 7, where the apparatus is a bar code reader.

12. A method of determining a distance to a target, comprising:

scanning a light beam across the target;

determining a distance to the target based on an image of the scanned light beam reflected from the target.

13. The method as in claim 12, where the step of determining comprises measuring a length of the image.

14. The method as in claim 13, where the step of determining comprises correlating the length of the image with the distance to the target.

15. The method as in claim 14, where the step of correlating includes ascertaining that the shorter the length of the image, the shorter the distance to the target.

16. The method as in claim 14, where the step of correlating includes ascertaining that the longer the length of the image, the longer the distance to the target.

* * * * *